United States Patent [19]

Mayfield

[11] Patent Number: 5,113,219
[45] Date of Patent: May 12, 1992

[54] PNEUMATIC PRESSURE PAD FOR CYCLICAL EVEN APPLICATION OF PRESSURE FORCES, PARTICULARLY FOR CONTACT DUPLICATION

[75] Inventor: James M. Mayfield, San Diego, Calif.

[73] Assignee: Anacomp, Inc., Atlanta, Ga.

[21] Appl. No.: 710,502

[22] Filed: Jun. 4, 1991

[51] Int. Cl.⁵ ............................................. G03B 27/20
[52] U.S. Cl. ........................................ 355/91; 355/87; 355/73; 355/76
[58] Field of Search ...................... 355/87, 91, 92, 93, 355/94, 73, 76; 352/222, 225; 226/95

[56] References Cited

U.S. PATENT DOCUMENTS

| | | | |
|---|---|---|---|
| 2,451,161 | 10/1948 | Fairbanks | 352/222 |
| 3,156,462 | 11/1964 | Weaver | 355/91 |
| 3,318,219 | 5/1967 | Anderson | 355/91 |
| 3,355,829 | 12/1967 | Butterbaugh | 355/91 |
| 3,413,903 | 12/1968 | Maldarelli | 355/91 |
| 3,510,217 | 5/1970 | Cirimele et al. | 355/91 |
| 3,797,797 | 3/1974 | Keller | 355/73 |

Primary Examiner—Monroe H. Hayes
Attorney, Agent, or Firm—Dressler, Goldsmith, Shore, Sutker & Milnamow, Ltd.

[57] ABSTRACT

A pneumatic pressure pad within an exposure stage of a microfiche duplication equipment cyclically reliably evenly progressively pressures a microfiche master film into uniform pressured contact with an unexposed film in order that the unexposed film may be exposed from the master film without appreciable distortion. A housing of the pneumatic pressure pad defines a chamber divided into separate volumes by a flexible diaphragm. A pneumatic source cyclically applies a differential air pressure between the chamber's two volumes and across the flexible diaphragm. Outside of the housing, an elastomeric pressure pad presents a substantially planar precision crowned surface in a direction oriented towards the planes of each of the unexposed and exposed films. A shaft connects the diaphragm to the pressure pad. Pneumatic movement of the diaphragm cycles the pressure pad in a direction orthogonal to the planes of the films, thereby to cyclically pressure the films into contact without inducing bowing, warping, wrinkles, or other distortions in either film.

16 Claims, 3 Drawing Sheets

PNEUMATIC PRESSURE PAD FOR CYCLICAL EVEN APPLICATION OF PRESSURE FORCES, PARTICULARLY FOR CONTACT DUPLICATION

BACKGROUND OF THE INVENTION

1. Field of the Invention

The present invention concerns pneumatic pressure pads, or actuators, for cyclically applying pressure forces evenly over an area. The present invention particularly concerns cyclically evenly pressuring an exposed master microfiche film into contact with an unexposed sensitized photographic film at an exposure station of a microfiche duplicator equipment by cyclical application of pressure forces from a reciprocating pneumatic pressure pad.

2. Background of the Invention

Machines for the duplication of film, and particularly microfilm and microfiche, are known. Some such machines are manufactured by Anacomp, Inc.—assignee of the present invention—at its Data Systems Division, and are supported by its Micrographics Engineering Division, P.O. Box 82449 San Diego, Calif. 92138. The duplication machines are commonly used to make multitudinous copies of a single microfilm, or microfiche, master that has typically been generated by, and during, a Computer Output on Microfilm (COM) process. Distribution of the duplicated microfilm or microfiche is an efficient way of disseminating voluminous amounts of information such as, for example, banking transaction records.

The images that appear upon the master, and upon the duplicated, films are typically word and number images. These images are commonly of type fonts, typically as small as 6 points in size, which have been optically reduced at magnification ratios commonly ranging to 96×. These minutely-sized images, and certain still smaller features that result from reducing original images smaller than 6 point type and/or at magnification ratios higher than 96×, demand that the duplication process should be very exacting, and of high quality. Meanwhile, a duplication rate on the order of 2000 copies per hour per duplication machine is typically required if certain large data bases maintained on microfilm or microfiche, such as the data bases generated by large multi-branch banks, are to be replicated each business day by the use of reasonable numbers—on the order of tens—of duplication machines.

The existing duplication machines that perform quality duplication at the required rates typically use the vesicular process: a copy film that has been exposed from a master film is developed by heat alone, and without use of any chemicals or gases. The duplication process is image reversing in that a negative master will produce a positive copy.

One station within a microfilm or microfiche duplication machine is an exposure station. At this station successive unexposed copy films, or successive regions of a roll of unexposed copy film, are exposed, one copy film or copy film region at a time, from a master film. The master film is typically held in a fixture, or jig. It and the copy film must be pressed together into tight uniform contact, and then exposed to a light (or other exposing radiation) source. In order that the fine detail of the image upon the master film should expose without appreciable distortion or blurring onto the copy film, it is necessary that the copy and master films, which are each flexible, should be held together with great uniformity, and without inducing bowing or wrinkling in either film.

This required pressing of a copy film and a master film into close uniform contact at the exposure station of a film, and particularly a microfiche, duplication machine has proven to be troublesome—especially when this pressing has been attempted to be cyclically repetitively accomplished at required high rates, typically faster than one cycle every two seconds. One existing mechanism for realizing the necessary close contact of the master and copy films during an exposure of the copy from the master is based on a moving mechanical stage called an "expose activate assembly". The expose activate assembly consists of (i) a solenoid-operated hook that holds a carriage bearing the copy film to be exposed in an exposure area, which hook is mounted to (ii) a motor-driven eccentric shaft that raises and lowers a platen to force the copy film upon the carriage into pressured contact with a master film that is simultaneously held upon a jig, or fixture. After exposure of the copy film the platen retracts, relieving the contact pressure, and the solenoid is energized so as to raise the hook, and permit the carriage to return to the load position.

The particular part of this particular previous mechanism that is of most relevance to the present invention is its moving platen. It is the planar surface of this platen that is used to press the copy film (as held upon the carriage) and the master film (as held in a jig) into tight contact. Alas, the alignment of the platen, and the results of its movement, are troublesome.

First, the platen must be both horizontally and vertically adjusted, or registered, relative to the master microfiche which is being copied. The horizontal and vertical adjustments determine that the copy film, as held upon the carriage which is moved by the platen, is, as such copy film is brought into pressured contact with the master fiche, of proper position relative to the image that is within the plane of such master microfiche. In order that film should not be wasted, the required registration of the image area of the copy film to the imaged area of the master fiche is typically quite exacting, and on the order of 0.010 inches (0.25 mm). A horizontal adjustment, or registration, of this precision is realized by four detents, each providing a 0.010 inch (0.25 mm) shift in platen position. A vertical adjustment, or registration, of this precision is obtained by two screws that position and align the platen relative to the carriage. Each turn of the vertical adjusting screws normally produces 0.03 inch (0.81 mm) of relative movement.

These adjustments, although sensitive, are not unsatisfactorily troublesome in and of themselves. Unfortunately, in the previous "expose activate assembly" mechanism at least the vertical adjustment within the image plane exhibits an undesirable interplay with a remaining, "z"-axis, adjustment. The "z"-axis, or up-down, adjustment determines that the plane of the copy film as held upon the carriage which is moved by the platen is, as such copy film is brought into pressured contact with the master fiche (held stationary upon a jig), everywhere parallel to the plane of such master fiche. In the previous "expose activate assembly" this adjustment is realized by four adjusting screws, and accompanying lock nuts, that are located at the four corners of the platen. The screws must be adjusted, and locked, so as to both (i) establish proper clearance between the platen and the carriage (holding the copy film), and (ii) establish the plane of the platen to be parallel to the plane of the copy film as held upon the carriage (and also to the plane of the master fiche as held upon the jig). The adjustment of both (i) play and (ii) parallelism is desirably to an accuracy of 0.005 inch (0.10 mm).

All these adjustments are, of course, desirably made and maintained at the indicated tolerances in order to ensure a repetitively reliable and quality duplication of microfiche. They are difficult to so make, and to maintain. In particular, the carriage and the copy film held upon the carriage are reciprocated relative to the frame, and relative to the master film that is fixedly held relative to the frame, not along an axis that is orthogonal to the plane of such master film, but rather along an axis that is skewed relative to this plane. This occurs because the platen is mounted to the duplication machine frame by a "bicycle-chain-type" linkage, and is constrained by this linkage in its movement. The resultant movement of the platen in direction which is not orthogonal to the plane of the mater film causes the previously mentioned interplay between the vertical adjustment(s) and the up-down adjustment(s).

This interplay, as well as the intricacy of the numerous adjustments themselves, make maintenance of the expose activate assembly undesirably labor intensive. Moreover, even such maintenance as is painstakingly and exactingly performed is—innately because of the non-orthogonal movement of the platen and of the copy film borne thereon relative to the master film during their movement together into pressured contact—of uncertain reliability to realize the uniform pressured contact between the two films that is mandated for high-quality duplication.

Another duplication equipment of Anacomp Inc., assignee of the present invention, also pressures a master and a copy film into tight contact at an exposure station while exhibiting fewer problems in so doing. This other equipment relies on a pneumatic bladder, or membrane. The elastomeric bladder is stretched across a rectangular chamber. The films that are to be pressured together are located on one side of the chamber and its bladder. Application of pneumatic pressure within the chamber, and on the opposite side of the bladder to the films, causes the bladder to expand towards the films, pressing the films into contact.

Although this mechanism, and method, is generally more precise and reliable than a mechanism based on moving stages connected by linkages, it also has limitations. The pneumatic bladder is subject to failure, especially where it abrades and stretches against the right-angle corners of the rectangular chamber. Because, upon release of the expansion air pressure, a return of the expanded bladder to its undistended position is based on the bladder's elastomeric properties, cycle speeds are limited. The evenness at which the pressure force may be applied over the area(s) of the workpiece film(s) is limited. Precision in control of the direction at which the pressure force is applied over the area(s) of the workpiece film(s) is limited.

As regards the (i) evenness, and (ii) direction, at which a pressure force is best applied over a prescribed area, it has been found that photographic films are most satisfactorily pressured into uniform, defect-free, even contact if the moving member that contacts such films is not precisely planar, but is very slightly (on the order of a few thousandths of an inch) crowned, or domed. Such a substantially planar crowned member is desirably moved in a direction precisely orthogonal to the plane(s) of the film(s). So moved and contoured, it serves to first, and (very slightly) most tightly, pressure the films together at the center of their image areas. Then the applied pressure force is successively radiated to ever more peripheral regions about this center as the crowned member is brought into ever closer proximity, and into ever stronger pressured contact, with the films.

In summary, it would be desirable to be able to cyclically pressure two flexible planar, film, workpieces into momentary tight physical contact with a high degree of reliability, repeatability, and precision. The film workpieces must be forced, or pressured, together in a manner that preserves the registration of an image area that is to be exposed upon a copy film with a corresponding exposed image area upon a master film. Equally importantly, each of the film workpieces must be forced to lie precisely in a plane without wrinkles, bows, bulges, mounds, creases, or anything else that extends above or below the plane—even minutely and/or over but a small localized region. Finally, the planes of the two film workpieces should be very precisely parallel to each other, and should lie proximate to each other insofar as the physical thickness of the films permit.

SUMMARY OF THE INVENTION

The present invention generally contemplates a pneumatic pressure pad for cyclically producing highly even pressure forces over an area. Moreover, the pressure forces are produced in a controllably even and progressive manner, and in a highly precise direction.

The present invention particularly contemplates use of a pneumatic pressure pad within an exposure stage of a microfiche duplication equipment in order to reliably cyclically progressively evenly directionally pressure a microfiche master film into uniform, even, pressured contact with an unexposed microfiche copy film so that the unexposed copy film may subsequently be exposed from the master film without appreciable distortion.

In its preferred embodiment the pneumatic pressure pad of the present invention is used in a machine of an existing type for duplicating exposed photographic film. Such a duplicator machine has a frame upon which an exposed photographic film is held, a transport mechanism affixed to the frame for moving an unexposed photographic film to a position proximate to the held exposed film, and an light source for exposing the unexposed photographic film from the exposed photographic film. During such exposure the unexposed and exposed films must be held together in pressured contact. This function is realized by a pneumatic pressure pad that cyclically moves in position relative to the frame, and relative to the exposed and unexposed photographic films, in order to cyclically pressure the exposed and unexposed films together into close planar contact during the exposure.

In accordance with the present invention, the pneumatic pressure pad is of a new and improved type. It includes a housing defining a chamber and orifices, a flexible diaphragm dividing the housing's chamber into separate volumes, and a pneumatic source for cyclically applying through one or more orifices of the housing a differential air pressure between the housing's chamber's two volumes, and across the flexible diaphragm. Outside of the housing, a pressure pad presents a substantially planar precision surface in a direction oriented towards a plane of each of the unexposed and exposed films. A shaft connects at one of its ends to the diaphragm for movement therewith. The shaft exits the housing through one of its orifices, and connects at its remaining end to the pressure pad at a location thereon which is oppositely disposed to the pressure pad's precision surface. An optional spring force biases in position the connected pressure pad, shaft, and diaphragm in a direction away from the films.

In operation of the pneumatic pressure pad, a cyclical application of differential air pressure from the pneumatic source causes the diaphragm to expand and to contract, reciprocating the shaft along its axis. The pressure pad that is attached to the shaft accordingly likewise reciprocates relative to the frame, and relative to the exposed and unexposed photographic films. In one, extended, direction of its reciprocating movement, the precision surface of the pressure pad contacts one— —normally the unexposed one—of the two films and forces the films together into contact, and against the frame. While the films are held tightly pressed together the unexposed film is exposed from the exposed master film, producing a new negative of the old image that is upon the master film. The pneumatic pressure pad in accordance with the present invention usefully cyclically produces a contact pressure in a very repeatably precise amount, very evenly over the area of contact, in a controllably progressive manner, and in a precise direction. The amount of contact pressure applied is adjustably predeterminable by the amount and pressure of the air that is pneumatically introduced into the housing, and across the diaphragm, during each cycle. These quantities are readily precisely controlled—including by use of a constant capacity pneumatic pressure pump and/or a pressure regulator—and the amount of contact pressure applied is accordingly highly uniform from cycle to cycle.

Probably more importantly, the contact pressure is always applied in a direction that is, and that is maintained to be, very precisely orthogonal to the plane of the films, and of a planar region of the frame against which region the films are held flat. A linear bearing guides the reciprocating movement of the shaft where the shaft passes through the orifice of the housing. This bearing establishes, and maintains, that the operative face of the pad that is affixed to the shaft will move into pressured contact with the films, and with the frame, without inducing any skewing, or bowing, or wrinkling of the film(s) whatsoever.

Finally, the pressure pad is preferably a laminate of (i) a steel plate, and, on the exposed surface, (ii) a plate of elastomeric material. The elastomeric face of the pressure pad preferably presents a very slight crown. Although it is previously known to crown the face of a pressure pad that is used to hold films in pressured contact during contact duplicating, such a crown was previously machined into the elastomer—an expensive and imprecise process. In accordance with the present invention the crown is instead machined into the metal backing plate. A pad of even-thickness elastomeric material is then mounted to the backing plate, and will exhibit a very uniform, durable and precise crown.

When the crowned elastomeric face of the preferred pressure pad is moved into pressured contact with the films it serves to press, and to hold, the films together, and against the frame, in a manner that, if not precisely even in pressure forces applied over the area of contact (being slightly greater at the center of the crown), serves to very smoothly, and gradually, pressure one film in contact with the other. This smoothly progressive contact permits, for example, that features considerably smaller than are presented by six point type reduced in size by 96× may reliably be duplicated over a microfiche exposure area of typically four (4) inches by six (6) inches without incurring any distortion due to imperfect film contact over the contact area. When it is considered that this contact area is cyclically established, and reestablished, at a typical rate of two (2) exposures per second, then the excellent reproduceability of contact forces, and force directions, that is accorded by the apparatus and method of present invention may be appreciated.

These and other aspects and attributes of the present invention will become increasingly clear upon reference to the following drawings and accompanying specification.

DETAILED DESCRIPTION OF THE PREFERRED EMBODIMENT

The present invention is embodied in a pneumatic pressure pad assembly, and in a film duplicating machine within which such pneumatic pressure pad assembly may advantageously be used.

Figure 1:
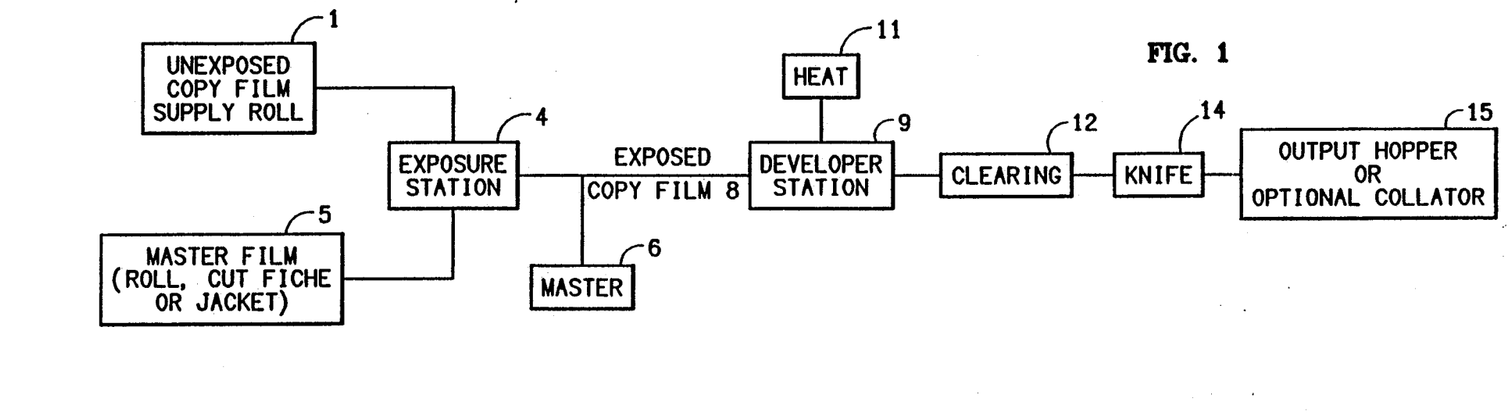
FIG. 1 is a flow chart of the stations and functions of an equipment for duplicating photographic film, particularly microfiche; including an exposure station and an exposure function that is supported by a pneumatic pressure pad in accordance with the present invention.

A flow chart of the stations and processes of a particular film duplicating machine in which the pneumatic pressure pad assembly in accordance with the present invention is suitably usable is shown in FIG. 1. A diagrammatic representation of the same film duplicating machine is shown in FIG. 2.

Figure 2:
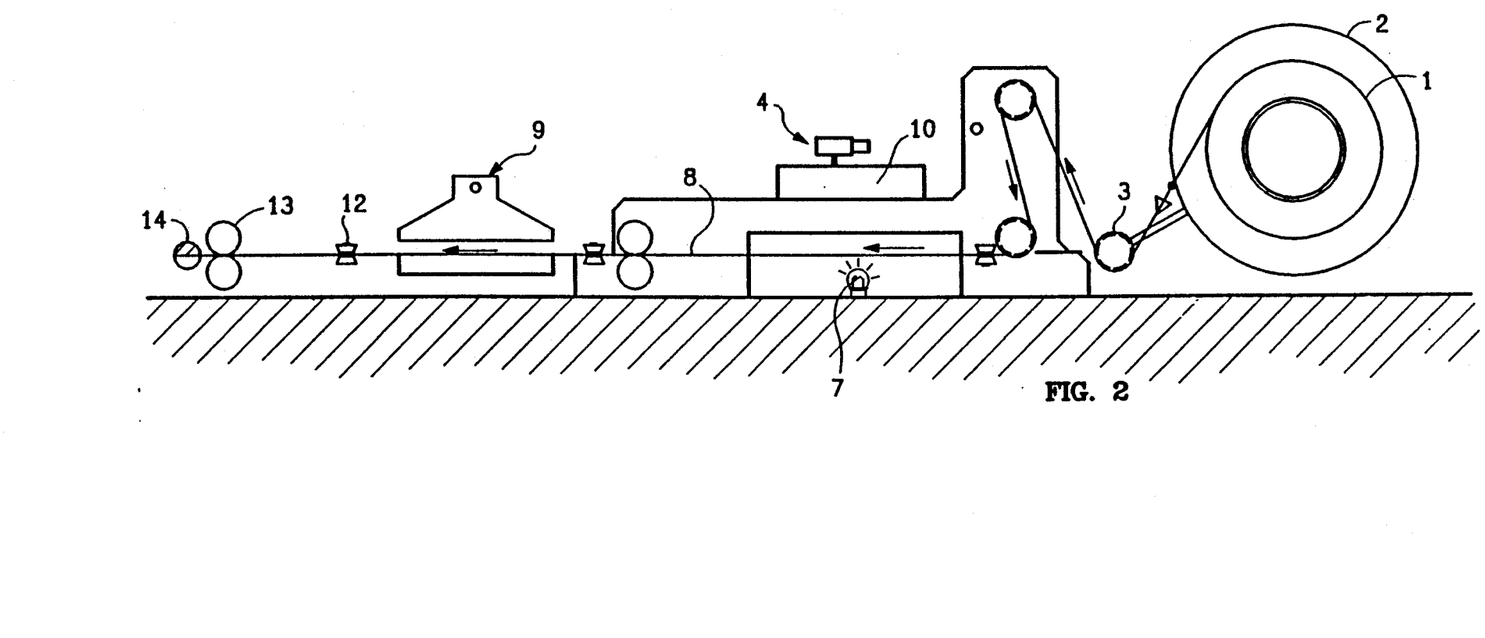
FIG. 2 is a diagrammatic representation of the same equipment for duplicating photographic film, particularly microfiche, that was previously flow charted in FIG. 1, including the exposure station and exposure function that is supported by a pneumatic pressure pad in accordance with the present invention.

The duplicating machine flow charted in FIG. 1 and represented in FIG. 2 may particularly be any of the microfiche duplicators types OP2131, OP2133, or OP2134; or any of the Model 2000 Series; each available from the Data Systems Division, or from the Micrographics Engineering Division, of Anacomp Inc. Other types and models of film duplicating equipments, including equipments for the duplication of film(s) other than cut microfiche, operate under equivalent principles, and correspondingly exhibit equivalent structure and function, to those particular machines that are shown in FIGS. 1 and 2. Accordingly, these other machines, and still other machines and applications requiring the precision pressured holding of planar workpieces, also present suitable environments for application(s) of the pneumatic pressure pad in accordance with the present invention.

Referring to FIGS. 1 and 2, an unexposed copy film, normally in the form of an UNEXPOSED COPY FILM SUPPLY ROLL 1 is fed from a reel 2 under control of a dancing arm 3 (shown in FIG. 2) and transported to an EXPOSURE STATION 4. Separately and independently a previously exposed and developed MASTER FILM 5 (shown in FIG. 1)—variously of the ROLL, CUT FICHE, OR JACKET types—is also transported to the EXPOSURE STATION 4. At this EXPOSURE STATION 4 a pneumatic pressure pad 10 (shown in FIG. 2, fully shown in FIG. 3) serves to bring successive areas of the unexposed copy film into tight physical contact, once per each successive area, with the exposed master film, normally a cut microfiche, that serves as the MASTER 6. Typically many successive exposures are made with the exposure lamp 7 (shown in FIG. 2) while one portion only of the MASTER FILM 5, normally one single cut microfiche, temporarily serves as the MASTER 6.

Each EXPOSED COPY FILM 8 is transported to a DEVELOPER STATION 9 where it is developed by application of HEAT 11 (shown in FIG. 1) in a vesicular process. The exposed and developed film passes through a CLEARING station 12 under force of capstan rollers 13 (shown in FIG. 2), and is cut into fiches by a rotary KNIFE 14. The cut film may be routed into an OUTPUT HOPPER OR OPTIONAL COLLATOR 15 (shown in FIG. 1). Additional guidance, cooling, clearing, and/or anti-static stations and/or elements (not shown) may be located where required or desired along the illustrated sequence of processing the workpiece film.

The duplication machine, and the multi-step duplication process, that is set forth in FIGS. 1 and 2 requires that a microfiche MASTER 6 should be temporarily pressured into tight, and uniform, physical contact with an unexposed region of a COPY FILM 1 during the period of the exposure of the COPY FILM 1 by the lamp 7. A pneumatic pressure pad 10 in accordance with the present invention for cyclically repetitively reliably realizing this pressured contact is shown in exploded perspective view in FIG. 3. The workpiece COPY FILM 1, and the MASTER (film) 6, are acted upon by pressure plate 101 and pad 114, and are not shown in FIG. 3.

Figure 3:
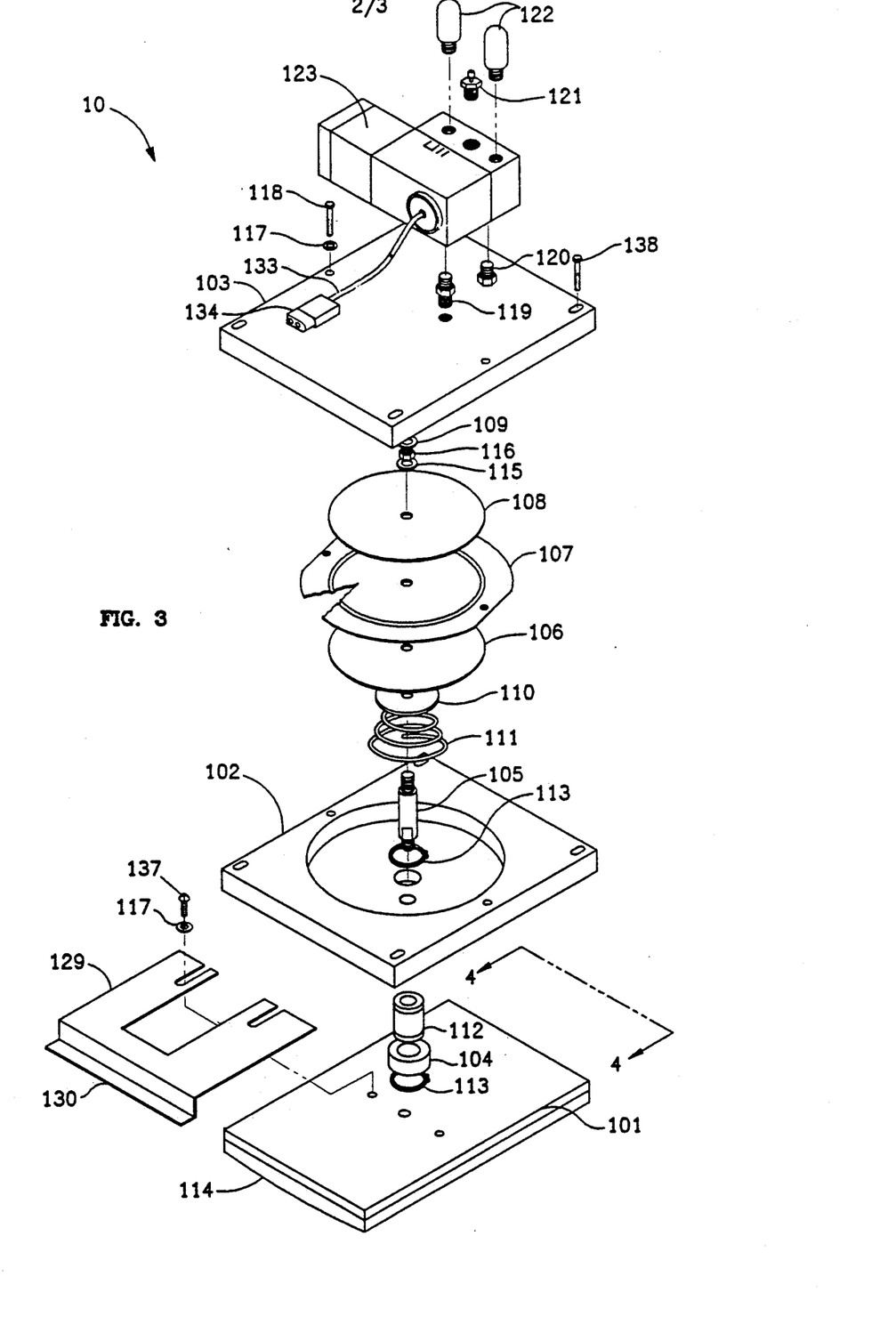
FIG. 3 is an exploded perspective view of a preferred embodiment of a pneumatic pressure pad in accordance with the present invention.

The purpose of the pneumatic pressure pad 10 is to (i) cyclically evenly apply a pressure force over an area substantially coextensive with its pad 114, particularly by (ii) maintaining the substantially planar pad 114 (as will be more particularly seen in FIG. 4) parallel to a plane of a planar workpiece(s) against which it presses, and (iii) moving the planar pad 114 in a direction orthogonal to its own (major) plane, and orthogonal to the plane(s) of the workpiece(s) against which it presses. Simplistically expressed, the purpose of the pneumatic pressure pad 10 is to press flat against a flat workpiece by act of moving a (substantially) flat surface in a direction orthogonal to the workpiece's flat surface, and evenly into contact therewith.

There are many mechanical and optical means for precisely establishing flat surfaces, for holding flat surfaces in a precisely parallel orientation, and for moving objects having flat surfaces in precisely predetermined directions. Some of these means are directed, as is the present invention, to pressing one flat surface against other flat surfaces. However, many existing means and methods of high precision operate quite slowly—in accordance with the precision involved.

The pneumatic pressure pad 10 in accordance with the present invention shown in FIG. 3 is capable of cycling its operative surface, or pad 114, in position at rates of 0.7 seconds per cycle, and faster. The pneumatic pressure pad 10 meanwhile maintains all pertinent surfaces to be parallel at all times, and particularly during that instant of time where the pad 114 comes into pressured contact with the workpiece (film), at a tolerance of better than 0.005 inches (0.10 mm).

The pneumatic pressure pad 10 of the present invention is thus a mechanism for cyclically exerting a dry (non-hydrostatic) pressure over an area in a manner so that the applied pressure is highly even during, as well as after, its application. This point deserves repeating: the pneumatic pressure pad 10 of the present invention does not simply produce or maintain an even terminal pressure over an area of a workpiece(s), it builds to this terminal pressure very evenly both in time (i.e., the application of pressure is progressive, and normally linearly progressive) and, most importantly, in space (i.e., the pressure builds, or abates, evenly at all points within the area).

Because the pneumatic motive forces, and the alignments, involved in operation of the operation of the pneumatic pressure pad 10 shown in FIG. 3 will prove to be readily comprehensible, it is tempting to work backwards from the solution offered by the present invention, and to find that it need not be difficult to apply pressure forces with the requisite precision. Needless to say, if it was an elementary matter to spatially move, and to evenly apply even pressure to, planar workpieces so insubstantial as two overlapping pieces of film then the mechanical stage or pneumatic pressuring devices of the prior art would not suffer the performance quality, nor the reliability, problems that are discussed in the BACKGROUND OF THE INVENTION section to this specification.

Considering FIG. 3, an air cylinder is created by pressure plate 101 moving under pneumatic force within a cylindrical cavity, or chamber, formed between lower half pressure chamber member 102 and upper pressure chamber member 103. A shaft spacer 104 maintains a minimum clearance between pressure plate 101 and the underside of lower half pressure chamber member 102. A pressure chamber piston shaft 105, threaded at both ends, is screwed at its lower end into the top of metal pressure plate 101. At its other, upper, end the piston shaft 105 connects to flexible diaphragm 107, which is typically made of neoprene rubber. The diaphragm 107 is sandwiched between lower and upper diaphragm support plates 106,108, and is retained to the threaded upper end thread of piston shaft 105 by washer 115 and nut 116. A compression spring 111 acting between the lower half pressure chamber member 102 and a flat washer 110 at the underside of diaphragm 107 force biases the diaphragm 107, and the piston shaft 105 to which it is connected, upwards. The upwards excursion of the diaphragm 107, and the piston shaft 105, under the force of spring 111 is limited by the contact of elastomeric piston buffer 109, adhesively mounted in a recess machined into the underside of upper half pressure chamber member 103.

In operation of the pneumatic pressure pad 10—which is shown in exploded perspective view in FIG. 3—the lower and upper half pressure chamber members 102,103 are sealed together airtight under force of screws 118 and washers 117. The diaphragm 107 has holes at its periphery, as illustrated, that slip certain of the screws 118. The diaphragm 107 serves as an airtight seal between upper and lower regions of the cylindrical chamber that is formed between lower and upper half pressure chamber members 102,103. The diaphragm 107, and the piston shaft 105 to which it is connected, are subject to move under a differential air pressure between the upper and lower regions of the cylindrical chamber. The lower region of the chamber is open to the atmosphere through a vent hole, and through tolerances surrounding the shaft 105. Airflow into, and out of, the upper portion of the chamber is through solenoid valve assembly 123 and nipple 119. The nipple 119 is threaded into both solenoid valve assembly 123, and a bore within the upper half pressure chamber member 103, and is secured with Teflon ® pipe tape (registered trademark of E. I. DuPont de Nemours & Co., Wilmington, Del., U.S.A.).

Figure 5:
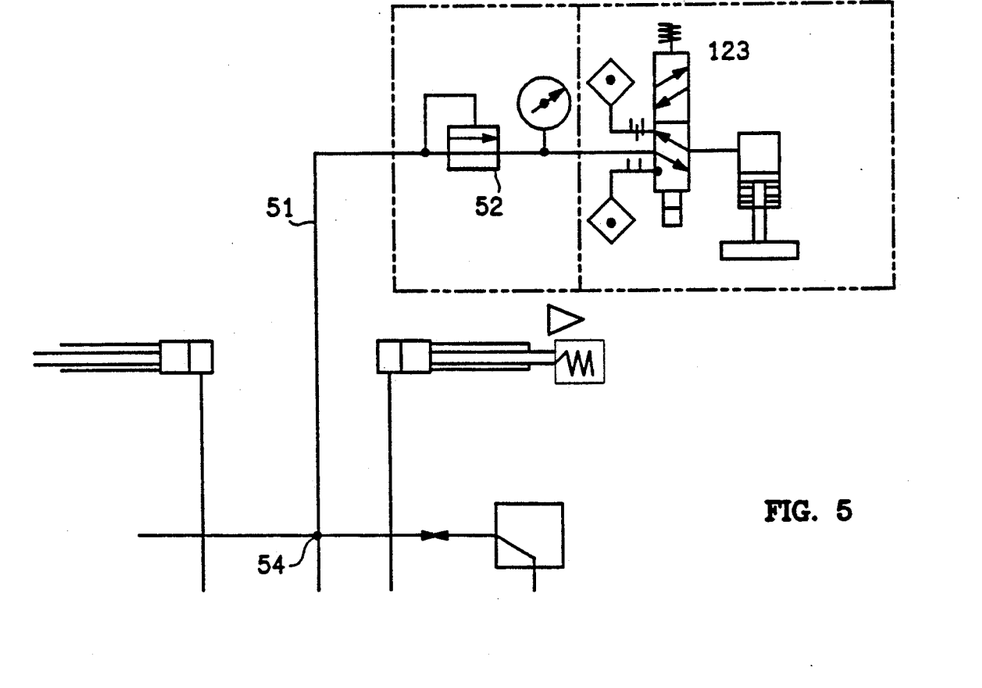
FIG. 5 is a schematic diagram of the pneumatic actuation of the pneumatic pressure pad in accordance with the present invention previously seen in FIG. 3.

The solenoid valve assembly 123 is supplied at its inlet fitting 121, which is also secured by pipe tape, with pressured air from an air compressor (not shown in FIG. 3, shown in FIG. 5) via a pressure hose (not shown in FIG. 3, shown in FIG. 5). A regulator (not shown in FIG. 3, shown in FIG. 5) in-line the external pressurized air supply maintains the pressure to solenoid valve assembly 123 at a predetermined constant value, typically 20 pounds per square inch (p.s.i.).

The gating by solenoid valve assembly 123 of pressurized air from its inlet fitting 121 to the chamber above diaphragm 121, or, at other times, from the chamber to the atmosphere through mufflers 122, is under control of electrical signals transmitted through wires 133 and plugjack 134. This electrical control is typically developed in response to an optical sensor (not shown) that monitors the position of a shutter to the light source 7 at exposure station 4 (shown in FIG. 2). It is obviously possible to cyclically control the operation of solenoid valve assembly 123 based on other sensed, or timed, conditions and/or signals.

Continuing in FIG. 3, a reciprocating motion of shaft 105 in response to the movement of diaphragm 107 within the chamber formed between lower and upper half pressure chamber members 102,103 is guided relative to such members 102,103 by the linear bearing 112. The linear bearing 112 is secured in position by retaining rings 113. The linear bearing 112 is of high quality in order to establish, and maintain over many millions of cycles, the precise position of reciprocating shaft 105, and of the pressure pad 114 affixed thereto. The linear bearing 112 is preferably a Super Ball Bushing ® (registered trademark of Thomson Industries, Inc.) linear bearing available from Thomson Industries, Inc., Port Washington, N.Y. 11050 U.S.A.

The film anchor 129 is secured to the metal pressure plate 101 by screws 137 and washers 117. It presents a foot 130, secured by adhesive, that sets against the EXPOSED COPY FILM 8 (shown in FIGS. 1 and 2) as such FILM 8 rests on the duplicating machine frame. The film anchor thus holds the film against any unwanted lateral movement along its length as might otherwise result from pulling forces at DEVELOPER STATION 9 (shown in FIGS. 1 and 2), or further in the microfilm duplication machine.

The chamber members 102,103 (and structure affixed thereto such as solenoid valve assembly 123) are positioned relative to the frame of a microfiche duplicating machine (shown in FIGS. 1 and 2) by socket head mounting screws 138 which pass through slotted holes in the chamber members 102,103. Accordingly, the chamber members 102,103 are constantly maintained in a precise positional relationship to the workpiece film(s) (not shown in FIG. 3) by these four screws 138.

Likewise, both the shaft 105 and its affixed pressure pad 114 positionally reciprocate relative to the members 102,103, and to the workpiece film(s) (not shown in FIG. 3), along a precise, and precisely predeterminable and predetermined, path. This path is in adjustably established to be a direction precisely orthogonal to the plane(s) of the workpiece film(s). By the reciprocating movement of the pressure plate 101 and its affixed pressure pad 114 along this path the workpiece films are best uniformly pressured into uniform even contact without such skewing, warping, bowing, wrinkling, or other distortions as occasionally beset films compressed with previous mechanisms.

In addition to the precision of the reciprocating movement of the pneumatic pressure pad 10, it has been found that, similarly to certain previous microfiche duplicators of the assignee of the present invention, that the pressuring of microfiche films into contact can benefit from a slightly crowned surface to the elastomeric pressure pad 114. It is hypothesized that this slight crown—the effectiveness of which is apparently enhanced by the orthogonal movement of the pressure pad 114 relative to the workpiece films—serves to press the films together from starting from an interior region of the ultimate area of pressured contact, and preceding successively progressively outward over this area of contact.

The center point or line of the crown, its offset (if any) relative to the area compressed, and its height are all parameters that are not necessarily obvious, nor even simple of empirical derivation. However, in accordance with the present invention, it has been recognized that the dimensional parameters of the crown, howsoever established and of whatsoever value, cannot be maintained at optimum if the crown of the pressure pad 114 is not absolutely stable, on the order of thousandths of an inch, over many millions of compression cycles. In previous embodiments of the pressure pad 114 its crown was machined into the elastomeric material. This operation was not only difficult and costly, but was occasionally imprecise. Moreover, a selection of an elastomeric compound for the pressure pad 114 from among compounds that could be precision machined, or molded, placed an undue limitation on the choice of materials. The material of the pressure pad 114 must meet criteria other than acceptance of a precision shape, such as the criteria of durability from wear, insensitivity to temperature and/or environmental gases and contaminants, and long-term retention of elastomeric properties.

Figure 4:
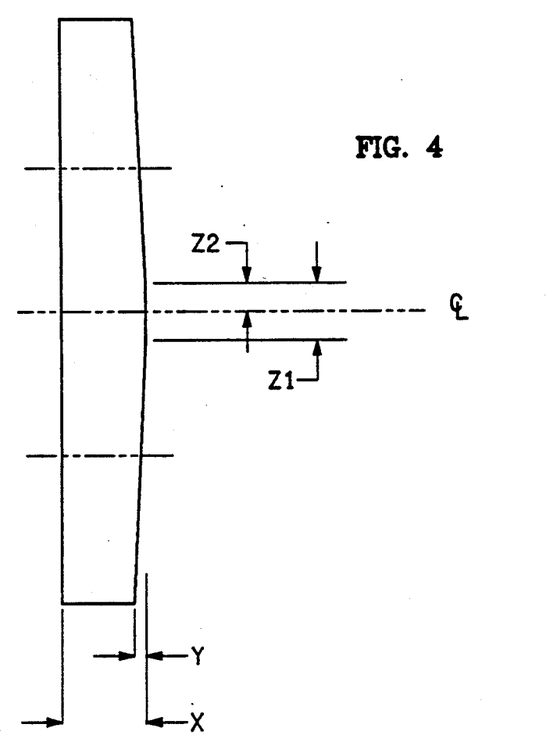
FIG. 4 is a cross sectional detail plan view of a preferred embodiment of a backing plate used in the pneumatic pressure pad in accordance with the present invention previously seen in FIG. 3.

In accordance with the present invention, the precision in the creation, and maintenance, of a crown to an elastomeric pressure pad 114 formed from any material is promoted by shaping the metal backing plate 101 to the pressure pad 114 instead of the pressure pad itself. A preferred contour for the metal backing plate 101 is shown in FIG. 4. The nominal thickness "X" of the plate 101 is $0.300 + 0.003 - 0.000$ inches. The centerline crown rises to a maximum height "Y" of $0.030 + -0.003$ inches above this thickness over the half the typical 4.0 inch total width of the plate 101. The centerline of the crown is accurately positioned within tolerances "Z1" equals $0.25 + -0.12$ inches, and "Z2" equals $0.13 + -0.06$ inches.

Equally, or more, important than the dimensions of the crown to backing plate 101 is that, when machined in steel, it imparts a precise, and precisely stable, crown to an adhered elastomeric pad 114 (shown in FIG. 3) of uniform thickness. The crown of the pad 114 is essentially equal to the crown of the plate 101. It is highly dimensionally stable and long-lived. It, along with the motion to which it and the entire pressure pad 101 is subjected, serves to repeatedly and reliably press film workpieces into undistorted pressured contact. When so pressured into contact, a copy film may be exposed from a master film with minimal loss, or distortion, of any images (normally alphanumeric characters) that appear upon the master film during the photographic replication of these images upon the copy film.

A schematic diagram of a pneumatic system suitable for cyclically repetitively actuating the pneumatic pressure pad in accordance with the present invention is shown in FIG. 5. Pressured air from an air compressor (not shown) is routed via a pressure hose 51 to the pneumatic pressure pad 10. This pressure hose 51 is typically flow connected to pressurized air used at other places within the microfilm duplication machine at connection point 54. A regulator 52 in-line the pressurized air supply maintains the pressure to solenoid valve assembly 123 (shown in FIG. 3) at a predetermined constant value, typically 20 pounds per square inch (p.s.i.).

In accordance with the preceding explanation, the several features of the present invention will be recognized to be susceptible of implementation in alternative forms. The pneumatic cylinder could be of a type other than a diaphragm type, such a ram type. The geometries of the surfaces for the pressuring of the copy and master films into contact are highly preferred. However, the dimensions of these surfaces are, to some degree, variable.

In accordance with these and other alterations and adaptations of the present invention, the invention should be interpreted in accordance with the following claims, only, and not solely in accordance with that preferred embodiment within which the invention has been taught.

What is claimed is:

1. A machine for duplicating exposed photographic film comprising:
   a frame upon which an exposed photographic film is held;
   a transport mechanism affixed to the frame for moving an unexposed photographic film proximate to the held exposed film;
   a pressuring mechanism for cyclically moving relative to the frame and relative to the exposed and unexposed photographic film in order to cyclically pressure the exposed and unexposed film together into close planar contact, the pressuring mechanism comprising:
      a pressure pad presenting a substantially planar precision surface directionally disposed towards a plane of each of the unexposed and exposed films;
      a shaft connected to the pressure pad oppositely to its precision surface; and
      a pneumatic air cylinder connected to the shaft for cyclically moving the shaft and the pressure pad connected thereto so that the pad's precision surface is reciprocated along an axis that is substantially orthogonal to the plane of each of the unexposed and exposed films; and
   an exposure means for exposing the unexposed photographic film from the exposed photographic film while the films are held together in pressured contact.

2. The duplicating machine according to claim 1 wherein the pneumatic air cylinder comprises:
   a housing defining a chamber and orifices;
   a flexible diaphragm dividing the housing's chamber into separate volumes; and
   means for cyclically applying a differential air pressure between the housing's two volumes and across the flexible diaphragm;
   wherein the shaft connects at one of its ends to the diaphragm at one side thereof for movement therewith, the shaft exiting the housing through an orifice of the housing;
   wherein the pressure pad is connected to the remaining end of the shaft at a location exterior to the housing; and
   wherein the cyclical application of differential air pressure causes the diaphragm to reciprocate the shaft along its axis, causing the pressure pad that is attached to the shaft to move relative to the frame and relative to the exposed and unexposed photographic films.

3. The duplicating machine according to claim 2 wherein the pneumatic air cylinder further comprises:
   a linear bearing guiding the reciprocating movement of the shaft through the orifice of the housing.

4. The duplicating machine according to claim 3 wherein the linear bearing is self-centering in order to promote that the application of pressure force by the pressure pad is in a direction substantially orthogonal to a plane of the unexposed, and a plane of the held exposed, film.

5. The duplicating machine according to claim 2 wherein the pneumatic air cylinder further comprises:
   a spring means for force biasing the pressure pad in separation from the photographic films.

6. The duplicating machine according to claim 1 wherein the pressure pad is crowned in order to facilitate that the unexposed and exposed photographic films should be pressured together, during movement of the pressure pad under force of the pneumatic cylinder, progressively from interior regions to exterior regions of the films.

7. The duplicating machine according to claim 6 wherein the crowned pressure pad comprises:
   a crowned metal backing plate connecting to the pneumatic air cylinder; and
   an elastomeric pad of substantially uniform thickness, mounted to the crowned metal backing plate and directionally disposed towards the unexposed film, for moving under force of the pneumatic cylinder into contact with the unexposed film.

8. A machine for duplicating exposed photographic film comprising:
   a frame defining a plane upon which plane an exposed photographic film is held;
   a transport mechanism affixed to the frame for moving in position an unexposed photographic film until it lies in a plane substantially parallel to a plane of the held exposed film, and to the plane of the frame;
   a pressuring mechanism, having and presenting a substantially planar precision surface, for cyclically moving its precision surface in an orthogonal direction relative to the plane of the frame and relative to the planes of the exposed and unexposed film, a movement in a one direction being in order to cyclically pressure the exposed and unexposed film together into close planar contact with each other and against the plane of the frame, the pressuring mechanism comprising:

a shaft having two ends;

a pad presenting a substantially planar precision surface directionally disposed towards, and parallel to, the plane of the frame and the planes of each of the exposed and unexposed photographic film, the pad being connected upon a surface opposite to its precision surface to an end of the shaft;

an actuating means, connected to the remaining end of the shaft, for forcing the shaft, and the pad connected thereto, so as to move the pad's precision surface in a direction orthogonal to the plane of the frame and to the planes of each of the exposed and unexposed photographic film in order to cyclically pressure the exposed and unexposed film together into close planar contact with each other and against the plane of the frame;

an exposure means for exposing the unexposed photographic film from the exposed photographic film while they are held together in pressured contact.

9. The duplicating machine according to claim 8 wherein the actuating means of the pressuring mechanism comprises:

a housing defining a chamber and orifices;

a flexible diaphragm dividing the housing's chamber into separate volumes and connected to the shaft;

means for cyclically applying a differential air pressure between the housing's two volumes and across the flexible diaphragm so as to cause the diaphragm to move the shaft along its axis, causing the pressure pad that is attached to the shaft to move othogonally relative to the plane of the frame and relative to the planes of the exposed and unexposed photographic film.

10. The duplicating machine according to claim 8 wherein the shaft of the pressuring mechanism is threaded, and threadingly engages each of the pad and the actuating means.

11. In a machine for duplicating exposed photographic film having a frame upon which an exposed photographic film is held, a transport mechanism affixed to the frame for moving an unexposed photographic film to a position proximate to the held exposed film, and a pressuring mechanism for cyclically moving relative to the frame and relative to the exposed and unexposed photographic film in order to cyclically pressure the exposed and unexposed film together into close contact, and an exposure means for exposing the unexposed photographic film from the exposed photographic film while they are held together in pressured contact, an improvement wherein the pressuring mechanism comprises:

a housing defining a chamber and orifices;

a flexible diaphragm dividing the housing's chamber into separate volumes; and pneumatic means for cyclically applying through orifices of the housing a differential air pressure between the housing's chamber's two volumes and across the flexible diaphragm;

a pressure pad presenting a substantially planar precision surface directionally disposed towards a plane of each of the unexposed and the exposed film; and a shaft connecting at one of its ends to the diaphragm at one side thereof for movement therewith, exiting the housing through an orifice of the housing, and connecting at the other of its ends to the pressure pad;

wherein the cyclical application of differential air pressure causes the diaphragm to reciprocate the shaft along its axis, causing the pressure pad that is attached to the shaft to move relative to the frame and relative to the exposed and unexposed photographic film.

12. The improvement to the pressuring mechanism of a film duplicating machine according to claim 11 further comprising:

a linear bearing guiding the reciprocating movement of the shaft through the orifice of the housing.

13. A method of duplicating exposed photographic film comprising:

holding exposed photographic film planar in a frame;

transporting an unexposed photographic film until it lies in a plane substantially parallel to a plane of the held exposed film;

pressuring an area of each the exposed and unexposed photographic films together by moving under pneumatic force a substantially planar precision surface in an orthogonal direction relative to the planes of the exposed and unexposed film in order to force the exposed and unexposed film together into close planar contact with each other, the pressuring comprising:

orienting a substantially planar precision surface of a moveable member in a direction disposed towards, and substantially parallel to, the planes of each of the exposed and unexposed photographic film;

connecting the moveable member, at a location thereon opposite to its precision surface, to an end of a shaft; and pneumatically forcing the shaft, and the moveable member connected thereto, so as to move the member's precision surface in the direction orthogonal to the planes of each of the exposed and unexposed photographic film in order by such movement to force the exposed and unexposed film together into close planar contact with each other; and exposing the unexposed photographic film from the exposed photographic film while they are in pressured contact.

14. The method of duplicating exposed photographic film according to claim 13 wherein the pressuring further comprises:

guiding the moving shaft in a linear bearing so that the member's precision surface is moved in the direction orthogonal to the planes of each of the exposed and unexposed photographic film.

15. The method of duplicating exposed photographic film according to claim 13 wherein the pressuring further comprises:

progressively contacting with a precision surface which, although substantially planar, is also slightly crowned, interior regions of the area of contact progressively proceeding to successively more peripheral regions;

wherein the progressive contact smoothly forces the exposed and unexposed films into the close planar contact without skewing, bowing or wrinkling the films.

16. A pneumatic actuator for cyclically exerting a substantially even pressure force over a planar area, the actuator comprising:

a housing defining a chamber and orifices;

a flexible diaphragm dividing the housing's chamber into separate volumes;

pneumatic means for cyclically applying through orifices of the housing a differential air pressure between the chamber's two volumes and across the flexible diaphragm;

a pressure pad presenting a substantially planar precision surface of elastomeric material; and a shaft connecting at one of its ends to the diaphragm at one side thereof for movement therewith, exiting the housing through an orifice of the housing, and connecting at the other of its ends to the pressure pad at a location opposite to its elastomeric precision surface;

wherein the cyclical application of differential air pressure causes the diaphragm to reciprocate the shaft along its axis, causing the pressure pad that is attached to the shaft to exert through its elastomeric precision surface a substantially even pressure force over any planar area with which it is brought into contact.

* * * * *

UNITED STATES PATENT AND TRADEMARK OFFICE
CERTIFICATE OF CORRECTION

PATENT NO. : 5,113,219
DATED      : May 12, 1992
INVENTOR(S): James M. Mayfield

It is certified that error appears in the above-identified patent and that said Letters Patent is hereby corrected as shown below:

On cover page, item [54], after "CONTACT DUPLICATION", add
—OF MICROFICHE—.

Column 1, line 5, after "CONTACT DUPLICATION", add —OF MICROFICHE—.

Signed and Sealed this

Twentieth Day of July, 1993

Attest:

MICHAEL K. KIRK

Attesting Officer

Acting Commissioner of Patents and Trademarks